United States Patent
Aron et al.

(10) Patent No.: US 12,124,685 B2
(45) Date of Patent: *Oct. 22, 2024

(54) SMART MAPPING DISPLAY ADJUSTMENT

(71) Applicant: Quantarium Group, LLC, Bellevue, WA (US)

(72) Inventors: Andrei Aron, Woodinville, WA (US); Cezar Ungureanasu, Sammamish, WA (US); Petru Cociorva, Redmond, WA (US); Adrian Fanaru, Sammamish, WA (US); Malcolm Cannon, Seattle, WA (US); Mihai Petriuc, Redmond, WA (US); Clement Ifrim, Sammamish, WA (US); Ioan Smintina, Kirkland, WA (US); Eugene Shnitko, Sammamish, WA (US); Roxana Paval, Iasi (RO); Diana Manzat, Iasi (RO)

(73) Assignee: Quantarium Group, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,667

(22) Filed: Aug. 26, 2022

(65) Prior Publication Data
US 2023/0024559 A1     Jan. 26, 2023

Related U.S. Application Data

(63) Continuation of application No. 17/385,477, filed on Jul. 26, 2021, now Pat. No. 11,455,089.

(51) Int. Cl.
*G06F 3/04842* (2022.01)
*G06F 3/04845* (2022.01)

(52) U.S. Cl.
CPC ...... *G06F 3/04842* (2013.01); *G06F 3/04845* (2013.01); *G06F 2203/04806* (2013.01)

(58) Field of Classification Search
CPC ............ G06F 3/04842; G06F 3/04845; G06F 2203/04806; G06F 3/0482; G06F 3/0488
See application file for complete search history.

(56) References Cited

U.S. PATENT DOCUMENTS

| | | | |
|---|---|---|---|
| 8,954,860 B1* | 2/2015 | Hands | G06F 16/954 715/738 |
| 9,600,146 B2* | 3/2017 | Cervelli | G06F 3/0482 |
| 9,727,669 B1 | 8/2017 | Wilson et al. | |
| 10,534,523 B1* | 1/2020 | Daniel | G06F 3/04845 |

(Continued)

FOREIGN PATENT DOCUMENTS

CN         114004632 A        2/2022

*Primary Examiner* — Ariel Mercado-Vargas (57) ABSTRACT

Systems and methods are disclosed for smart mapping, including dynamically recalculating a heatmap of displayed map entries based on changes to a map displayed on a viewport. In certain embodiments, a method may comprise providing a display of a map on a user interface, determining selected geographic tiles depicted on the display, and loading selected data corresponding to map entries from the selected geographic tiles only. The method may further comprise generating a heatmap on the display based on comparing the selected data, determining changes at the user interface resulting in a different set of geographic tiles depicted on the display, and dynamically generating a new heatmap based on the changes.

19 Claims, 6 Drawing Sheets

(56) References Cited

U.S. PATENT DOCUMENTS

| | | | |
|---|---|---|---|
| 10,896,234 B2 * | 1/2021 | Takahashi | G06F 16/338 |
| 2013/0117072 A1 | 5/2013 | Nish | |
| 2013/0166348 A1 | 6/2013 | Scotto | |
| 2013/0297378 A1 | 11/2013 | Hong | |
| 2014/0218400 A1 | 8/2014 | O'Toole et al. | |
| 2014/0344296 A1 * | 11/2014 | Chawathe | G06F 16/9537 |
| | | | 707/769 |
| 2015/0074137 A1 | 3/2015 | Chang et al. | |
| 2015/0193470 A1 | 7/2015 | Romaya | |
| 2016/0080438 A1 | 3/2016 | Liang | |
| 2017/0052654 A1 | 2/2017 | Cervelli et al. | |
| 2017/0052747 A1 * | 2/2017 | Cervelli | G06T 11/001 |
| 2017/0337305 A1 | 11/2017 | Wilson et al. | |
| 2018/0089791 A1 * | 3/2018 | Greenwood | G06T 1/20 |
| 2018/0143998 A1 * | 5/2018 | Prahladka | G06F 16/29 |
| 2019/0102798 A1 * | 4/2019 | Jain | G06Q 30/0261 |
| 2019/0243621 A1 | 8/2019 | Gass et al. | |
| 2020/0013102 A1 | 1/2020 | Yeldham | |
| 2021/0279750 A1 | 9/2021 | Breunig | |
| 2021/0328999 A1 * | 10/2021 | Chu | H04L 63/0876 |

* cited by examiner

SMART MAPPING DISPLAY ADJUSTMENT

CROSS-REFERENCE TO RELATED APPLICATION

The present application is a continuation of and claims priority to U.S. Pat. No. 11,455,089, filed Jul. 26, 2021, entitled "Smart Mapping", the contents of which are hereby incorporated by reference in their entirety.

SUMMARY

In certain embodiments, a method may comprise providing a display of a map on a user interface, determining selected geographic tiles depicted on the display, and loading selected data corresponding to map entries from the selected geographic tiles only. The method may further comprise generating a heatmap on the display based on comparing the selected data, determining changes at the user interface resulting in a different set of geographic tiles depicted on the display, and dynamically generating a new heatmap based on the changes.

In certain embodiments, a memory device may store instructions that, when executed, cause a processor to perform a method comprising providing a display of a map on a user interface, determining selected geographic tiles depicted on the display, and loading selected data corresponding to map entries from the selected geographic tiles only. The instructions may cause the processor to perform the method further comprising generating a heatmap on the display based on comparing the selected data, determining changes at the user interface resulting in a different set of geographic tiles depicted on the display, and dynamically generating a new heatmap based on the changes.

In certain embodiments, an apparatus may comprise a memory including executable instructions, and a processor configured to execute the executable instructions. The instructions may cause the processor to provide a display of a map on a user interface, determine selected geographic tiles depicted on the display, and load selected data corresponding to map entries from the selected geographic tiles. The instructions may further cause the processor to generate a heatmap on the display based on comparing the selected data, determine changes at the user interface resulting in a different set of geographic tiles depicted on the display, and dynamically generate a new heatmap based on the changes.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1A:
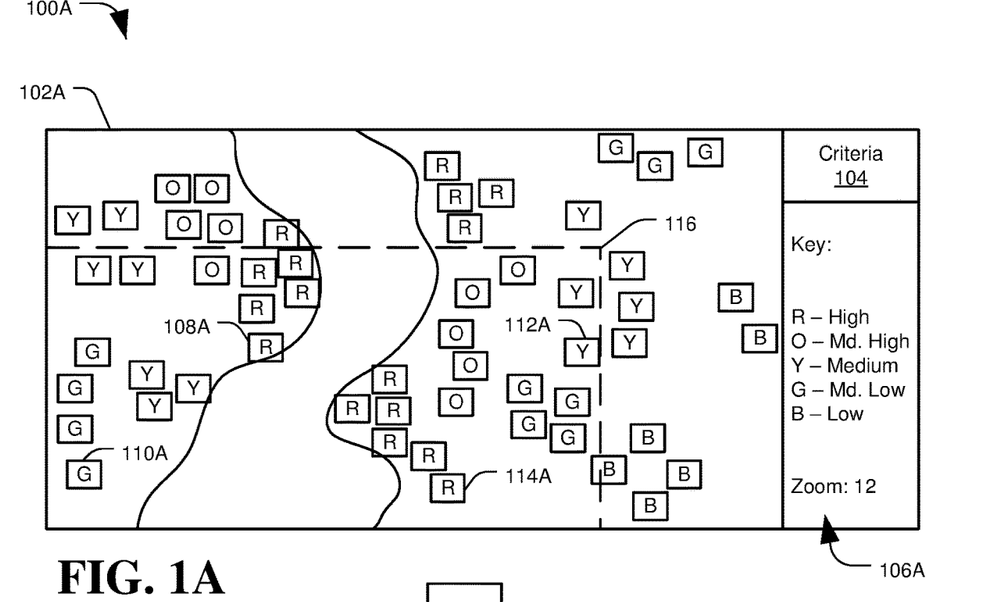
FIGS. 1A and 1B are diagrams of a system configured for smart mapping, in accordance with certain embodiments of the present disclosure.
Figure 1B:
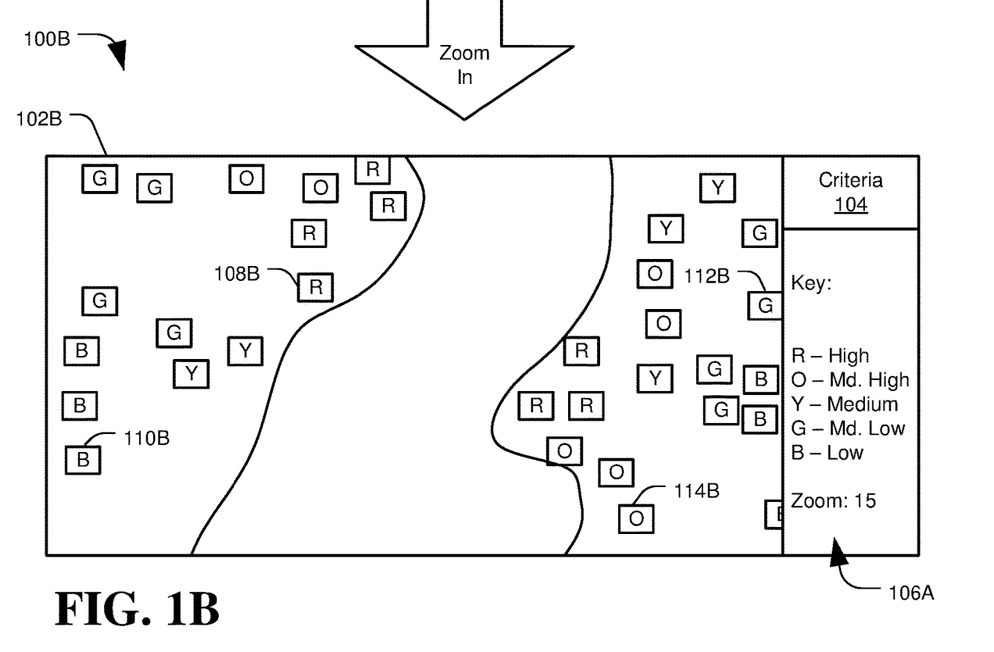

FIGS. 1A and 1B are diagrams of a system 100A, 100B configured for smart mapping, in accordance with certain embodiments of the present disclosure. In particular, FIGS. 1A and 1B depict a viewport or user interface (UI) display screen for a map display system. FIG. 1A depicts a viewport 102A at a first map zoom level, while FIG. 1B depicts a viewport 102B at a second map zoom level, with the map more zoomed in than in 102A. For ease of description, elements depicted in both FIGS. 1A and 1B will be referred to generally by shared number, with an "A" or "B" appended only when calling attention to a particular feature of an element in FIG. 1A or 1B.

Viewport 102 may display a map having a number of map entries, including map entries 108, 110, 112, and 114. Map entries may include properties, cities or neighborhoods, businesses, landmarks or points of interest, or other map locations. In one example, the display 102 may be part of a program or web interface for a property listing service, which can display properties in an area for the purposes of home or apartment sale or rental listings. Map entries 108-114 may have variable display features, such as shape, size, or color. For example, different types of properties may have a different display graphic or icon. Individual map entries may be color-coded according to one or more display criteria. For example, map entries with high values for a selected criteria 104, relative to other map entries, may be displayed with a warmer color, while map entries with low values for a selected criteria 104, relative to other map entries, may be displayed with a cooler color. In this manner, the system 100 may generate heatmaps relative to a selected criteria 104 using the map entries 108-114.

In addition to the map itself, the viewport 102 may also include menus, map keys, or other UI display or interactable elements. For example, viewport 102 may include a criteria selection element 104, which may allow a user to select one or more display criteria for the map elements 108-114. Example criteria may include total property value, land value, improvements value, price per square foot, total area, age of construction, zoning types, building type (e.g. single family homes, apartments, etc.), or other display criteria. The criteria UI element 104 may include any element for selecting display criteria, such as a search bar, check-boxes, sliders, or drop-down menus. The display criteria selected via the criteria UI element 104 may influence what map entries 108-114 are displayed on the map, or may affect the appearance or manner in which the map entries are displayed. For example, selecting a "price per square foot" criteria may cause the map entries 108-114 to be color-coded according to each property's price per square foot.

In an example embodiment, the viewport 102 may also include a map key or map details display element 106. The map details display 106 may include a variety of details about the map viewport, such as zoom level (e.g. zoom level 12 in 106A, and zoom level 15 in 106B), coordinates, scale, or other details. The map details display 106 may also include a key identifying display colors, icons, or other details for map entries 108-114. For example, if a particular display criteria is selected in criteria selection element 104 (e.g. property value), each map entry 108-114 may be color-coded according to the selected criteria. The colors may be, e.g. red (R) for high (e.g. high property value), orange (O) for medium-high, yellow (Y) for medium, green (G) for medium-low, and blue (B) for low. The color key may for the map entries may be displayed in the map details display 106.

System 100 may be configured to dynamically adjust how a particular map entry 108-114 is displayed based on what other map entries are displayed on the viewport 102. Each map entry 108-114 may have a display color or other distinguishing graphic feature, for example based on one or more selected criteria 104. In some examples, the color may correspond to how strongly the map entry corresponds to the selected criteria relative to the other displayed map entries. The display color for each displayed map entry 108-114 may also be dynamically adjusted based on the color or relative criteria values of other map entries currently displayed on the viewport 102. For example, if the system uses five colors to indicate heat map gradients or tiers, the system may dynamically distribute the colors of the displayed properties such that approximately 20% of displayed properties are categorized into each color tier (e.g. the 20% of properties with the highest values for the selected criteria may be colored (R) red, while the 20% of properties with the lowest values for the selected criteria may be colored (B) blue, etc.). Other heat map color distribution schemes may also be used. The currently displayed viewport 102, including displayed map entries or map grid squares, may be used to dynamically select a color for individual map entries, to generate broader heatmaps based on collections of map entries, to consolidate multiple map entries into a single composite map entry, or for other dynamic map adjustments.

An example of dynamic map entry adjustment is described in regard to FIGS. 1A and 1B, which depict an operation of adjusting the visible map entries 108-114 in the viewport 102 by zooming in on the map. Viewport 102A depicts a plurality of map entries, including map entries 108A to 114A, with the map at a zoom level 12, as shown in map details display 106A. In viewport 102A, the map entries each have a corresponding color, as described above. The colors may indicate how strongly each map entry correlates to a selected criteria 104 (e.g. property value), with the correlation between color and criteria described by the key in detail display 106A.

In a particular example of FIG. 1A, the map entries in viewport 102A may represent properties near a river, with properties closer to the riverfront having a higher property value, and thus having more R (red) and O (orange) entries. Properties farther from the riverfront may have a lower property value, and thus including more B (blue) and G (green) properties. The color distribution of colors among properties may be based on a comparison of property values of the map entries displayed in the viewport 102A. In FIG. 1A, properties 108A and 114A are red, property 110A is green, and property 112A is yellow.

The map displayed in viewport 102A may then be zoomed in, from zoom level 12 to the higher magnification zoom level 15, on the box 116 encompassing the lower-left portion of viewport 102A. The zoomed-in map is displayed in viewport 102B of FIG. 1B. Due to zooming in, a number of map entries that were visible in viewport 102A are no longer visible in viewport 102B. Accordingly, the system providing the smart mapping display may recalculate the colors for the map entries displayed in viewport 102B, based on the new, smaller set of visible map entries. In viewport 102B, map entry 108B may have remained red (relative to viewport 102A). However, map entry 114B may have been reduced from red to orange; map entry 110B may have reduced from green to blue, and map entry 112B may have reduced from yellow to green. Zooming in may have cut off the display of a number of properties having lower property values, and so properties visible in 102B that may have had moderate relative values in the FIG. 1A set may now have lower relative values in the FIG. 1B set.

The dynamic adjustment to the map entries may be performed using any suitable algorithm for comparing a set of scalar values associated with the map entries, based on one or more selected criteria 104, based on other factors, or any combination thereof. While example explanation has been provided of dynamically adjusting map entries based on changing a zoom level, dynamic adjustments may be made due to other changes to the displayed map. For example, panning (e.g. shifting) the portion of the map visible in the viewport 102 may also result in a different set of map entries being visible, and a dynamic adjustment of the characteristics of the map entries. In another example, which map entries are displayed may be adjusted via the user interface (e.g. by entering a different search criteria 204, or toggling certain types of map entries to be shown or not shown, such as homes, apartments, or empty lots). Map entry color has been provided as an example of how the map entries 108-114 can be dynamically adjusted as the viewport 102 or visible map entries are changed, but other modifications can be made. For example, the icon, size, shape, or other characteristic of map entries may dynamically be adjusted. Further, dynamic grouping or separating of map entries may be performed. An example of grouping map entries is described in regard to FIGS. 2A-2B.

Figure 2A:
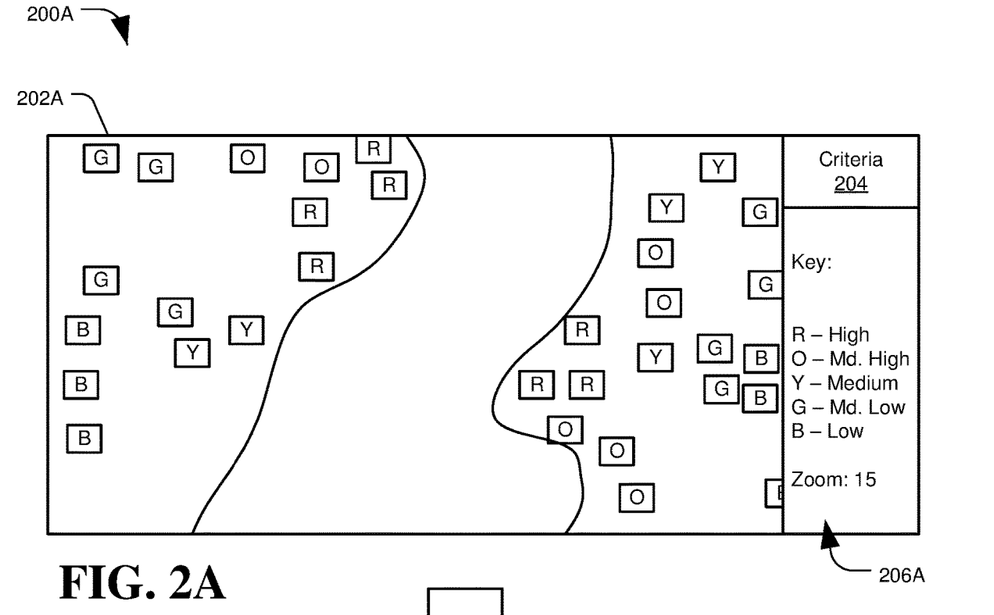
FIGS. 2A and 2B are diagrams of a system configured for smart mapping, in accordance with certain embodiments of the present disclosure.
Figure 2B:
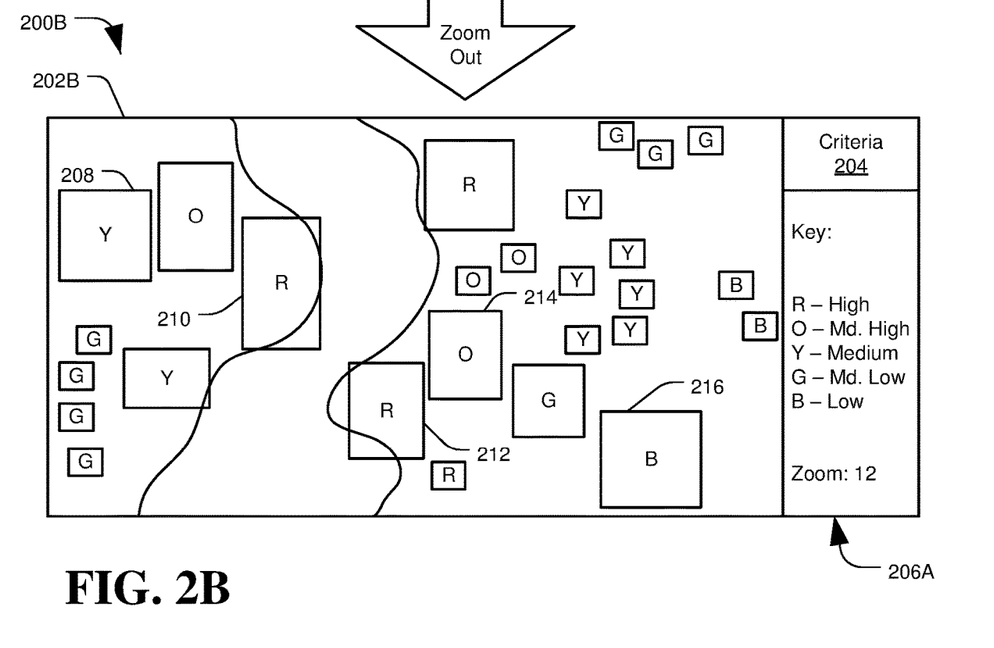

FIGS. 2A and 2B are diagrams of a system 200A, 200B configured for smart mapping, in accordance with certain embodiments of the present disclosure. Similar to FIGS. 1A-1B, FIG. 2A depicts a viewport 202A at a first map zoom level, zoom level 15, as shown on the map detail pane 206A. FIG. 2B depicts a viewport 202B at a second map zoom level, zoom level 12, as shown in map detail pane 206B, with the map having been zoomed out relative to 202A. For ease of description, elements depicted in both FIGS. 2A and 2B will be referred to generally by shared number, with an "A" or "B" appended only when calling attention to a particular feature of an element in FIG. 2A or 2B.

Similar to FIG. 1B, viewport 202A of FIG. 2A shows a "zoomed in" view of a map including a plurality of properties, which have corresponding colors based on a selected criteria 204. When the view of the map shown in viewport 202A is zoomed out, the map shown in viewport 202B of FIG. 2B may be seen. As described in regard to FIGS. 1A and 1B, zooming out may display additional map entries that were not visible on the zoomed in map, which may cause the system to dynamically adjust the colors associated with the map entries.

In addition or instead of adjusting colors for the map entries, the system may dynamically adjust or implement other features based on changing the visible map entries or the portion of the map displayed in the viewport 202. For example, the system 200 may consolidate or conglomerate multiple individual map entries into a single map entry. For example, if the density of map entries in an area of the map rises above a selected threshold, the system 200 may consolidate multiple map entries into a single map entry. In some embodiments, the system 200 may prioritize consolidating map entries having a similar value, e.g. for the selected criteria 204. In other examples, the system 200 may consolidate map entries based on map entry density in a region, or based on a combination of both density and value similarity.

In the depicted example of FIG. 2B, multiple map entries are consolidated into larger map entries at 208, 210, 212, 214, and 216, while individual map entries in more sparse regions of the map may remain separate. The color of the consolidated map entries may be calculated based on the individual values of the constituent smaller map entries. For example, the system 200 may only consolidate individual entries having the same color, or it may calculate an average, median, or similar value for the consolidated map entry based on the different values or colors of the constituent map entries. In the depicted example of FIG. 2B, the consolidated map entries are shown as larger rectangular map entries; however, in some examples, regions of the map or land may merely be colored in, forming irregular shapes. When regions are colored based on constituent map entries, the constituent map entries may be obscured or hidden so that only the regional coloration is shown, or the constituent map entries may continue to be shown, with all of the region around them colored in to indicate broad color trends. In this manner, a variety of heat maps may be generated based on the map entries currently displayed on the viewport 202.

The described smart mapping implementation may provide a variety of advantages. For example, an appraiser may look for comparable properties when attempting to value a home. However, appraisers may not have personal familiarity with a home or neighborhoods in an area, especially when performing remote "desktop" appraisals for an area the appraiser has not been to. By dynamically adjusting map entries and heatmaps based on the currently displayed viewport 202, an appraiser may be able to quickly determine most comparable properties within a desired region. The system 200 may be configured to generate heatmaps on multiple fields, either one-at-a-time or simultaneously, based on a variety of criteria 204 such as total home value from one or more AVMs (automated valuation models), value per square foot, year built, quality code (e.g. based on materials used in the construction), land ratio (e.g. appreciation of land portion of the assessment year over year), on other factors, or any combination thereof. In some examples, the appraiser may draw a polygon around a region of the map based on the heatmap information for selecting comparable properties. In other examples, the system 200 may be configured to generate a polygon around or select comparable properties automatically, for example based on one or more selected criteria 204 and an identification of the property to be appraised. An example system for implementing the smart mapping features described herein is described in regard to FIG. 3.

Figure 3:
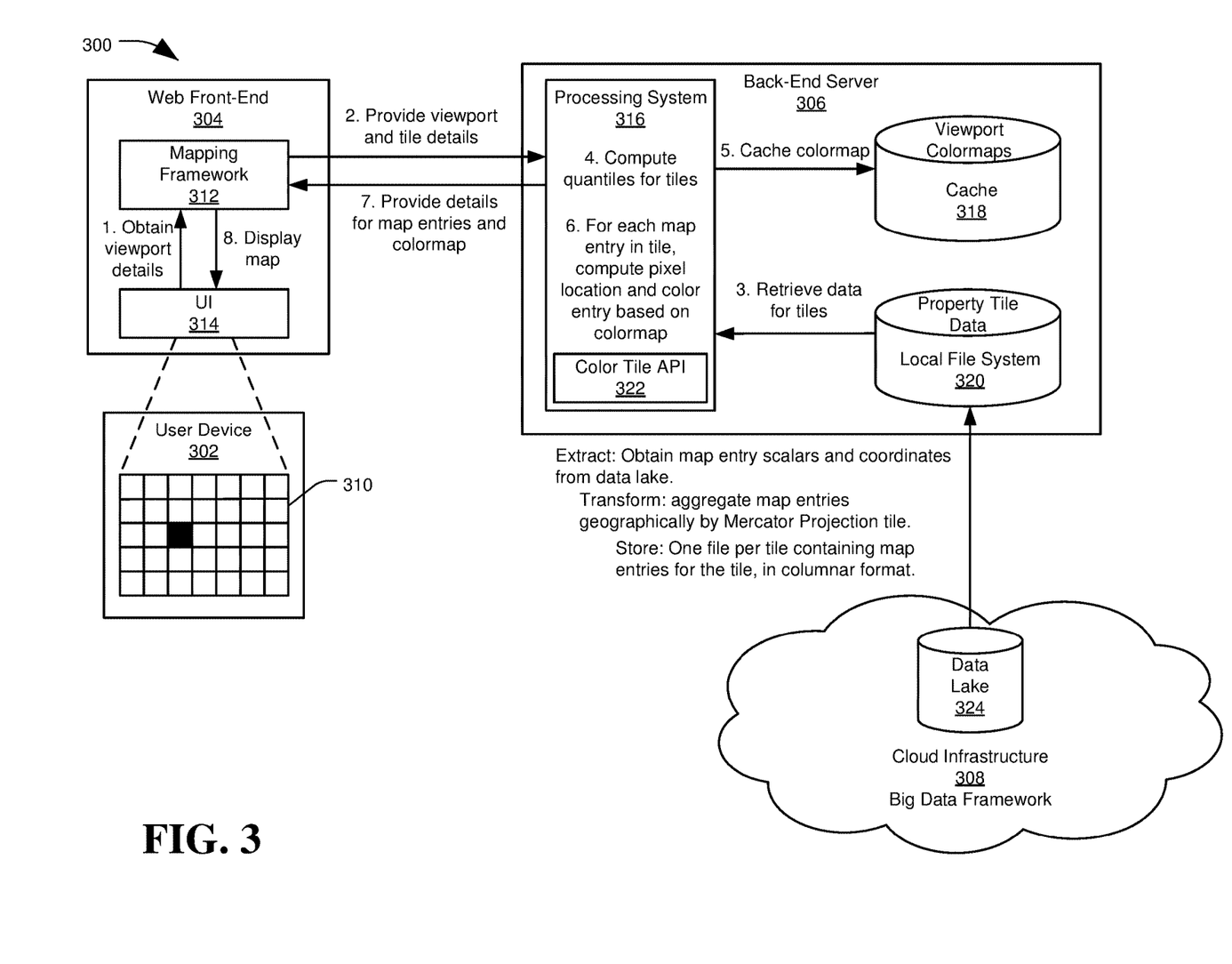
FIG. 3 is a diagram of a system configured for smart mapping, in accordance with certain embodiments of the present disclosure.

FIG. 3 is a diagram of a system 300 configured for smart mapping, in accordance with certain embodiments of the present disclosure. In particular, system 300 provides an example set of elements for implementing smart mapping functionality at a user device. System 300 may include a user device 302, a web front-end 304, a back-end server 306, and a cloud infrastructure 308.

User device 302 may be a desktop computer, laptop computer, smart phone, tablet, set top box, or other device. User device 302 may have one or more memories, processors, executable instructions, and other modules configured for executing operations related to smart mapping as described herein. User device 302 may include one or more user interface, such as a touchscreen, pointer device, keyboard, other user interface elements, or any combination thereof. User device 302 may have a communication interface for communicating with remote devices, such as via wired or wireless internet, cellular connectivity, or other methods. Further, user device 302 may include a display element or screen 310, which may display a viewport of a map for the purposes of smart mapping, such as viewport 102 of FIGS. 1A-1B and viewport 202 of FIGS. 2A-2B.

Web front-end 304 may include a module configured for receiving user inputs for a smart mapping interface, as well as generating and displaying the smart mapping interface, including the viewport, map entries, the map itself, map detail panels, selectable map criteria, and other related information. Web front-end 304 may include a mapping framework module 312, and a user interface module 314. Web front-end 304 may be implemented or executed at user device 304 (e.g. by a processor within user device 304), at a processing device remote from user device 304 (e.g. at a back-end server 306, with map display data and user inputs communicated to the web front-end 304 over the internet), or a combination thereof (e.g. with the UI module 314 implemented at user device 302, and mapping framework 312 implemented at a remote system).

The UI module 314 may be configured to display a map, map entries, and other map data on a display of the user device 302, for example based on map information received from mapping framework 312 or back-end server 306. User inputs received at user device 302 may also be received by UI module 314, and information from user inputs or from the current map display may be communicated from UI 314 to mapping framework 312 or to a back-end server 306.

Mapping framework module 312 may be configured to determine what map entries and other details to display or are being displayed. For example, the mapping framework 312 may provide the UI module 314 details on what coordinates to display, what map entries should be displayed at what locations, what color or graphic representation the map entries should have, and other details. When user inputs are received by the UI 314 that would modify the displayed map, such as by changing a zoom setting, panning or shifting a portion of a map displayed in the viewport, changing display criteria, or other inputs, the mapping framework 312 may determine how those inputs correlate to a change in the displayed map. The mapping framework 314 may also determine data received from the UI 314 that should be provided to a back-end server 306, and may receive calculations or data from the back-end server 306 and reflect that information on the map displayed at the user device 302.

Back-end server 306 may be configured to retrieve, store, and process data associated with map entries for display on user device 302 via web front-end 304. Back-end server 306 may include a processing system 316, a cache memory 318, and a local file system 320, as well as a communication interface configured to enable communication with other devices over a network, such as web front-end system 304, user device 302, or cloud infrastructure 308.

Processing system 316 may include one or more processor circuits, firmware, or other modules configured to process data about maps and map entries to provide smart mapping functionality as described herein. Processing system 316 may include a color tile API (application programming interface) 322, which may include a module configured to perform some or all of the calculations or processing as described herein for the processing system 316, the back-end server 306, or both. Further, the color tile API 322 may manage communications with the web front-end 304. Processing system 316 may be configured to retrieve data about map entries (e.g. individual properties or map locations), organize the data according to map tiles, compute quantiles or distributions of scalars for the map tiles based on the map tiles, generate and store a colormap or heatmap for a viewport of a selected set of map tiles, and determine pixel location and coloring for map entries based on the colormap, and provide the determined display data to the web front-end 304.

"Map tiles" may refer to Mercator Projection tiles for a map. Mercator projection may refer to projecting the spherical Earth into a rectangular map. The rectangular map may be divided into tiles (e.g. square or rectangular segments of the map), which may be referred to herein as tiles, map tiles, geographic tiles, Mercator Projection tiles, or similar terminology. The size of map tiles may be determined according to required needs or performance of the smart mapping system, and may be based on a typical zoom levels of a viewport on a user display 310 (e.g. so that 35 tiles are typically displayed at zoom level 12), a density of map entries on the map, or other factors.

The processing system 316 may organize map entry data based on a selected map tile size and distribution. The map entry data for each map tile may be stored in a desired format, for example to minimize loading times. For example, storing map entry data in columnar format may accelerate access for a map that has different selectable searching or display criteria. Storing data in binary format (e.g. a computer file other than a text file to reduce processing time translating data from text into computer-processable numeric format) may further reduce access times. Accordingly, all map entries located within a selected map tile may be stored to a single columnar binary data file. The processing system 316 may determine the map tiles visible in a viewport of a user display 310, load the data files corresponding to those map tiles, and generate one or more colormap or heatmap for the viewport based on the map entries visible in the viewport.

The local file system 320 may include a file system program, as well as one or more memories, such as hard drives, for storing map entry data based on map tiles. Local file system 320 may include nonvolatile memory configured for storing significant amounts of data. The cache 318 may include one or more memories, and used to store colormaps or heatmaps generated for the map tiles displayed in one or more viewport settings (e.g. the viewport's displayed position and zoom level). Cache 318 may include volatile or nonvolatile memory, and may have a shorter access time than the memory of the local file system 320.

Cloud infrastructure 308 may include a big data framework, which may store large quantities of data about map locations, properties, and other map data. For example, cloud infrastructure 308 may include one or more data sources, such as map data from different providers or databases. The map data available via cloud infrastructure 308 may be stored to one or more memories, servers, databases, or other data sources, referred to collectively as data lake 324. The back-end server 306 may extract or obtain map entry scalars and coordinates from the data lake 324. Map entry scalars may include individual data points, such as square footage, list price, year built, etc. Based on the coordinates for each map entry, the back-end server may aggregate map entries (and their associated data) geographically based on the Mercator Projection tiles in which each map entry is located. The data for the map entries may be converted into a desired file format (e.g. columnar binary data format), with one file for each map tile, and stored to the local file system 320.

In an example operational process flow for system 300, mapping framework 312 may obtain viewport details from UI module 314, at step 1. Viewport details may include a zoom level and coordinates of the viewport displayed on user device 302. In some embodiments, the viewport details may include an indicator of what map tiles are displayed within the viewport. In other embodiments, the displayed map tiles may be determined by mapping framework 312 or by processing system 316 of the backend server 306.

At step 2, the mapping framework 312 may provide the viewport and tile details to processing system 316, for example via an internet connection. Based on the viewport and tile details, the processing system 316 may retrieve data for the displayed tiles from local file system 320, in step 3. In some examples, the viewport and tile details received by the processing system 316 may include one or more selected search or display criteria (e.g. year-over-year land valuation), and the processing system 316 may limit retrieved data to the selected criteria and other necessary information (e.g. property coordinates). In other examples, all data for the displayed map tiles may be retrieved.

At step 4, the processing system 316 may compute quantiles for the loaded map tiles, which may include determining one or more colormaps or heatmaps for the viewport based on the scalar values for the map entries in all of the displayed map tiles. The processing system 316 may use various approaches, algorithms, or processes to generate the colormaps or heatmaps, such as U-Nets (a form of convolutional neural network), agglomerative clustering, random sample consensus (RANSAC), other methodologies, or a combination thereof. The colormaps or heatmaps may be generated based on individual criteria or scalar values, or a colormap or heatmap may be generated based on a combination of criteria (e.g. based on land value and year built). The colormaps or heatmaps may be stored to the cache 318 for fast access, at step 5. For example, different colormaps may be generated for different map criteria (e.g. property value, year built, etc.) for the current viewport, and those values may be stored to the cache 318. If the user maintains the current viewport but changes the display criteria, the colormaps or heatmaps can be quickly accessed from the cache without recomputing the maps.

At step 6, the processing system 316 may, for each map entry in the viewport or for each tile, compute a location (e.g. by pixel) and display information (e.g. color, icon, etc.) based on the colormap. In some examples, additional outputs may be generated, either by the processing system 316 or by the web front-end 304, such as determining and displaying a boundary for a "comp selection" area of properties determined to provide good comparisons to a selected property for price determination, or a list of selected comparison properties having data values similar to a selected property.

The details for the map entries may be provided from the back-end server 306 to the mapping framework 312 of the web front-end 304 in step 7. The mapping framework 312 may convert the map entries and colormap information into a format usable by the UI 314 for displaying the map details on the user device 302. At step 8, the map display information may be provided to the UI 314 and displayed in the viewport 310 of the user device 302. A flowchart of a process for smart mapping is described in regard to FIG. 4.

Figure 4:
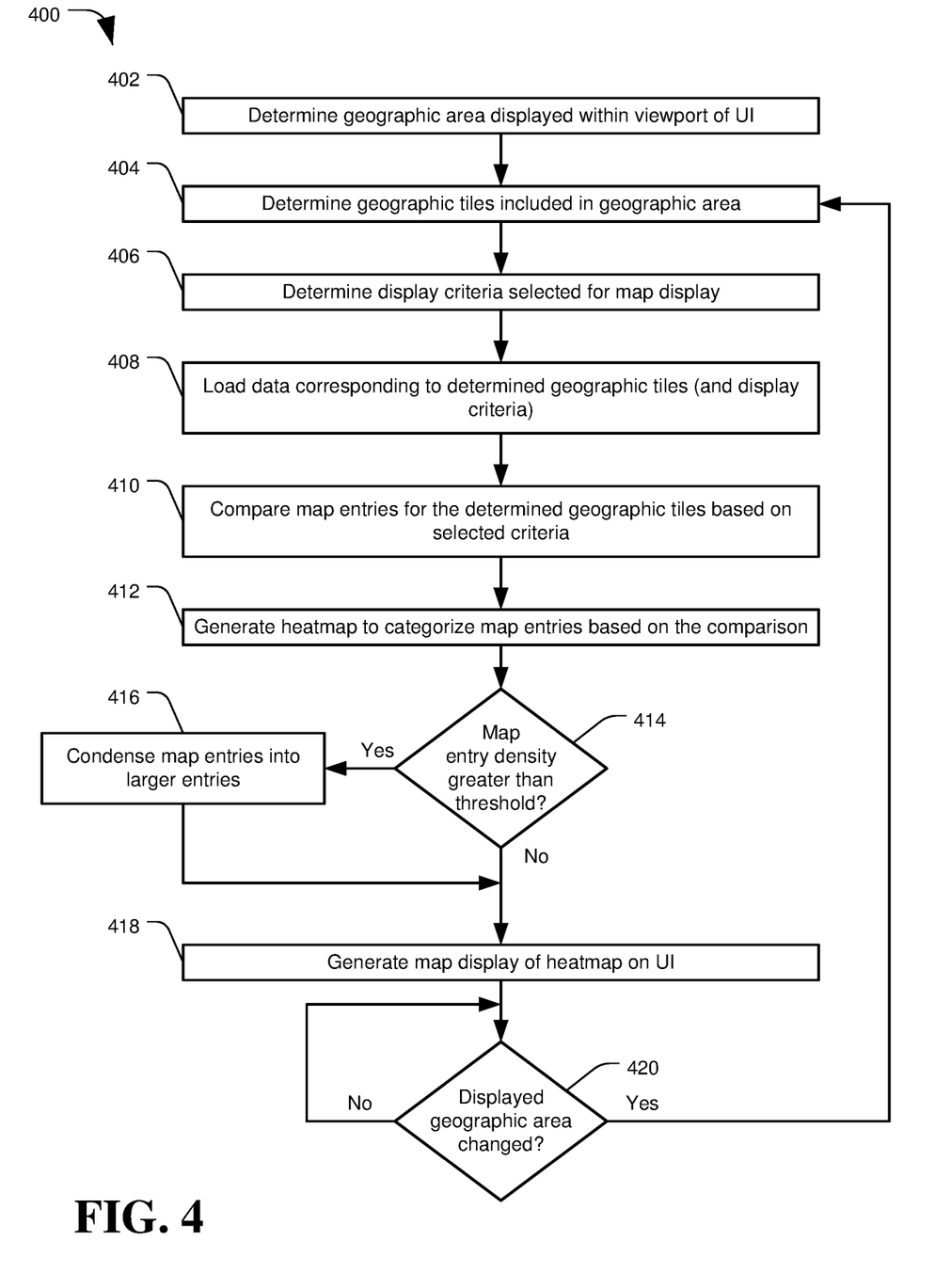
FIG. 4 depicts a flowchart of an example method for smart mapping, in accordance with certain embodiments of the present disclosure.

FIG. 4 depicts a flowchart of an example method 400 for smart mapping, in accordance with certain embodiments of the present disclosure. Method 400 may be implemented via one or more components of system 300 of FIG. 3, such as processing system 316 of back-end server 306, or mapping framework 312 of web front-end 304.

Method 400 may include determining a geographic area displayed within a viewport of a user interface (UI) display, at 402. For example, a geographic area displayed may be determined based on a coordinate of a center or one or more corners of the viewport and a zoom level. A set of geographic or map tiles included in the geographic area displayed on the viewport may be determined, at 404. For example, the smart mapping system may maintain a database or chart correlating map tiles to map coordinates, and may therefore use the geographic area displayed in the viewport to determine which map tiles are being displayed. Method 400 may also include determining one or more selected display criteria for the map display. For example, a user may select a display criteria of year-over-year land valuation as a criteria for showing a heatmap or colormap for the map entries within the viewport.

At 408, the method 400 may include loading data corresponding to the determined geographic data. For example, the smart mapping system may maintain one file for each map tile that includes all the information for every map entry within the map tile. The method 400 may include loading the entire file for each map tile being displayed, or it may only load data for each map entry corresponding to one or more selected display criteria.

The method 400 may include comparing the map entry data for the determined geographic tiles to determine a distribution of data values across the map entries of the current viewport display, at 410. In some examples, the comparison may be performed based on the selected display criteria. At 412, the method 400 may include generating one or more colormaps or heatmaps to categorize the map entries based on the comparison. For example, categorizing the map entries may include determining a color for each map entry, determining which entries may be condensed into a single map entry, where the boundaries of different heat or color zones may be based on the map entries, or other determinations.

The method 400 may include determining whether the map entry density of all or a portion of the map in the viewport is greater than a selected threshold, at 414. For example, based on a zoom level of the viewport, a number of map entries in some locations may be too high to clearly display as separate map entries. The selected threshold density may be set by a manufacturer or administrator of the smart mapping system, may be set by an end user of the system (e.g. via a UI interface), or otherwise determined. If the map entry density is higher than the threshold, the method 400 may include condensing map entries in the crowded area into one or more consolidated map entries, at 416. For example, multiple map entries may be combined into a single box or colored region having display values determined by its constituent entries. Although not depicted, a determination may similarly be made at 414 whether previously consolidated map entries can now be divided back into smaller sub-entries, for example based on the map viewport having been zoomed in to lower the map entry density.

If the map entry density is not greater than the threshold, at 414, or after map entries have been condensed, at 416, the method 400 may include generating a map display on a user interface, at 418. The map display may reflect or graphically represent the heatmap generated at 412, as well as individual map entry coloration or graphic representation.

A determination may be made, at 420, whether the displayed geographic area has changed. For example, the viewport may have been zoomed in or zoomed out, panned to a different location, or a new search may have been performed which generated an entirely new map viewport location. If the geographic area has not changed, the method 400 may include continuing to monitor for changes to the geographic area. If the displayed geographic area has changed, the method 400 may include returning to 404 to determine the geographic tiles included in the new geographic area. In this manner, the smart mapping system may dynamically generate a new heatmap, based specifically on the map entries displayed within the viewport of UI, in response to changes to a displayed geographic region of a map.

Figure 5:
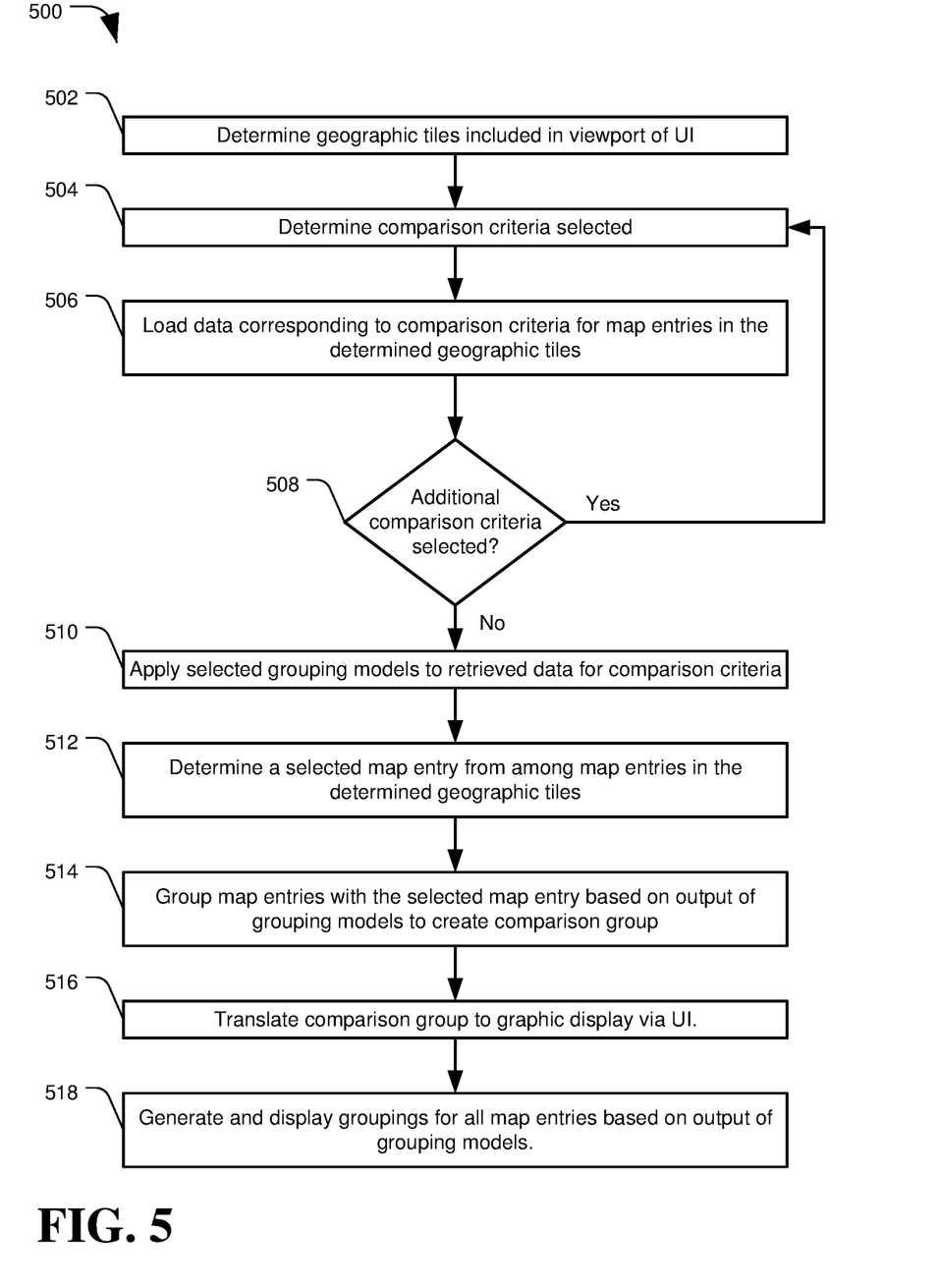
FIG. 5 depicts a flowchart of an example method for smart mapping, in accordance with certain embodiments of the present disclosure.

Turning now to FIG. 5, a flowchart of an example method 500 for smart mapping is depicted, in accordance with certain embodiments of the present disclosure. In particular, method 500 is an example process for automatically determining a group of "comps", or similar properties to a selected property, for the purposes of generating a valuation estimate for the selected property. The selected comparison group can be used, for example, by an automated valuation model (AVM) system to determine a value estimate for a selected property. Method 500 may be implemented via one or more components of system 300 of FIG. 3, such as processing system 316 of back-end server 306, or mapping framework 312 of web front-end 304.

Method 500 may include determining geographic tiles included or displayed in a viewport of a UI, at 502. At 504, a selected comparison criteria, for comparing different map entries or properties (e.g. yearly assessed land value increases), may be determined. The method 500 may include loading data corresponding to the comparison criteria for map entries in the determined geographic tiles, at 506. For example, a columnar data file can be accessed for each geographic tile, and the criteria values for each property within the geographic tiles can be retrieved. At 508, a determination may be made whether additional comparison criteria is also selected. For example, a user may wish to compare properties based on yearly valuation increases, year built, and square footage. If additional comparison criteria are selected, the criteria may be determined and retrieved, at 504 and 506. Optionally, all the selected criteria may be determined together, and the relevant data for the map entries can be retrieved in a single operation.

At 510, method 500 may include applying one or more selected grouping models to the retrieved data for the selected comparison criteria. For example, the system may determine which properties are most similar to each other according to the selected criteria. This process may be applied for determining heatmap or colormap distributions, for determining colors or graphical representations for individual properties, for determining which properties may be consolidated into a single map entry, or for other smart mapping functions as described in the present disclosure.

Method 500 may include determining a selected map entry from among the map entries in the determined geographic tiles, at 512. For example, a user (e.g. a human or an automated system) may designate or select a property or map entry for generating a valuation estimate. Method 500 may group map entries with the selected map entry based on an output of the grouping model, thereby creating a comparison group. For example, the method 500 may include determining map entries that have values for the comparison criteria that most closely correspond to the selected map entry. In some examples, the comparison group map entries may be limited to those within a selected geographic range from the selected property. In another example, properties may be disqualified from the comparison group if any criteria values for that property exceed a value range relative to the selected property (e.g. if the selected property is 1,800 sq ft, properties above 2,600 sq. ft. or below 1,200 sq. ft. may be disqualified, even if the other comparison criteria is similar).

At 516, the method 500 may include translating the comparison group to a graphic display format via a user interface (UI). For example, map entries of the comparison group may be highlighted in a particular color, or the comparison group entries may be surrounded by a polygonal outline generated by the smart mapping system. In another example, the method 500 may include generating and displaying a listing of properties in the comparison group, such as using a text-based list of comparison properties. In some examples, method 500 may include generating and displaying groupings for other map entries, including those not in the comparison group, based on the output of the grouping models, at 518. This may include displaying one or more colormaps or heatmaps within the viewport, showing how all properties within the viewport compare according to the selected comparison criteria. An example computing system configured to perform smart mapping is discussed in regard to FIG. 6.

Figure 6:
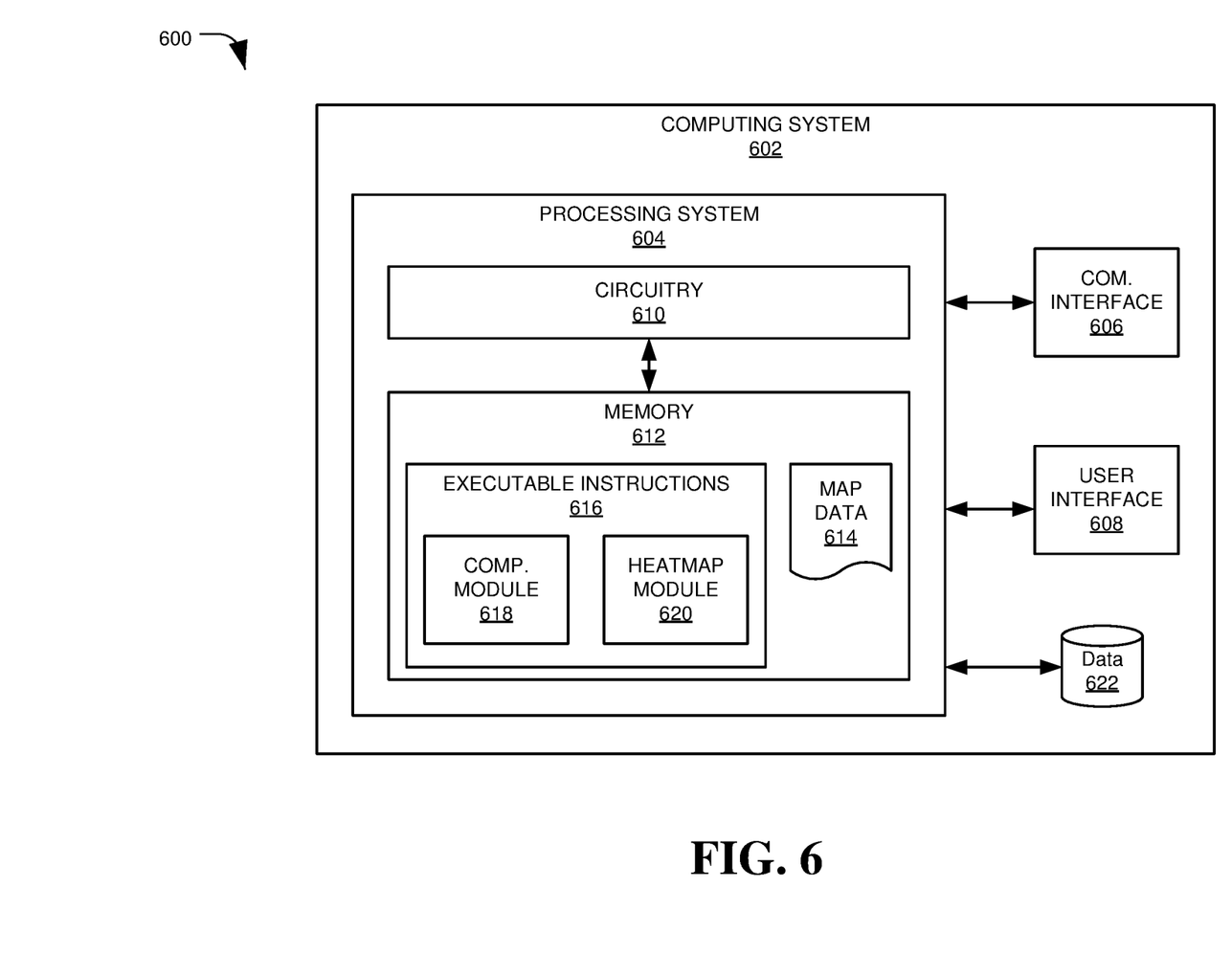
FIG. 6 is a diagram of a system configured for smart mapping, in accordance with certain embodiments of the present disclosure.

FIG. 6 is a diagram of a system 600 configured for smart mapping, in accordance with certain embodiments of the present disclosure. In particular, FIG. 6 depicts a computer system 602, which may be an example of any computing system that is configured to perform the operations of user device 302, web front-end 304, or back-end server 306, and related processes and methods. Computing system 602 may include a processing system 604, a communication interface 606, a user interface 608, and a data storage system 622. Computing system 602 may include other components such as a power source and enclosure that are not shown for clarity. Computing system 602 may comprise one or more server computing systems, desktop computing systems, laptop computing systems, smartphone devices, or any other computing system, including combinations thereof.

Communication interface 606 may comprise components that communicate over communication links, such as network cards, ports, radio frequency (RF), processing circuitry and software, or any other communication devices. Communication interface 606 may be configured to communicate over metallic, wireless, or optical links.

Communication interface 606 may be configured to use Time Division Multiplex (TDM), Internet Protocol (IP), Ethernet, optical networking, wireless protocols, communication signaling, other communication formats, or any combinations thereof. In particular, communication interface 1006 may be configured enable communications over a network between user device 302, web front-end 304, back-end server 306, and cloud infrastructure 308.

User interface 608 may comprise components that interact with a user to receive user inputs and to present media or other information. User interface 608 may include a display screen, touch screen, touch pad, keyboard, buttons, speaker, microphone, pointer device or interface, communication port, other user input/output apparatus, or any combination thereof.

Data storage system 622 may include any combination of nonvolatile and volatile memory, such as one or more hard disk drives, NAND solid-state memory, DRAM (dynamic random access memory), or other memory system. Data storage system 622 may include internal processors or controllers for performing data storage and retrieval operations received from processing system 604.

Processing system 604 may be linked to communication interface 606, user interface 608, and data storage system 622. Processing system 604 can include processing circuitry 610 and memory device 612. Memory device 612 can store executable instructions or other operating software 616, map data such as colormaps or heatmaps, logs, tables, databases, or other stored information 1014.

Processing circuitry 610 may comprise a microprocessor and other circuitry that can retrieve and execute instructions 616 from memory device 612. Memory 612 may comprise a non-volatile data storage medium, such as a disk drive or solid state drive, or volatile memory such as random access memories (RAM) and dynamic RAM (DRAM), or any other memory apparatus. Some data or programs may be loaded from data storage system 622 into memory 612 based on instructions from processing system 604. Processing circuitry 610 may be mounted on a circuit board that may also hold memory device 612 and portions of communication interface 606, user interface 608, and data storage system 622.

Executable instructions 616 may comprise computer programs, firmware, or some other form of machine-readable processing instructions. Executable instructions 616 may include comparison module 618, and heatmap module 620, although related operations may be handled by multiple different modules or programs, and additional or different modules may be included in executable instructions 616. Executable instructions 616 may further include an operating system, utilities, drivers, network interfaces, applications, or some other type of software. When executed by processing circuitry 610, executable instructions 616 may direct processing system 604 to operate computing system 602 as described herein.

Comparison module 618 may be a set of instructions for determining a set of map tiles depicted in a viewport, retrieving map entry data from map data 614 or data storage system 622 corresponding to the map tiles, and comparing the map entry values to determine a distribution of values for the currently depicted viewport. The comparison module 618 may be configured to dynamically retrieve data and recalculate the map entry comparisons in response to changes in the map tiles depicted on the viewport. The comparison module 618 may use one or more processes or algorithms to compare the values from the map entries for the displayed tiles, and the comparison process may be different for different comparison criteria. In some examples, the comparison module 618 may also determine one or more comparison groups of properties that are similar to a selected property according to comparison criteria, as described in method 500.

Heatmap module 620 may be configured to generate colormaps or heatmaps based on the comparisons performed by the comparison module 618. For example, the heatmap module may assign colors or visual signifiers to map entries, or to map regions or zones, based on the comparison results. The heatmap module 620 may also perform other map-based functions, such as generating polygonal areas around certain locations or sets of map entries, determining when to consolidate multiple map entries into a unified map entry, when to separate a combined map entry into separate entries, or other information relevant to generating visual smart mapping indicators.

Map data 614 may represent stored data of the system 602, and in particular may include map information for a current viewport. For example, map data 614 may include data for map entries currently displayed on a viewport, generated colormaps or heatmaps for the currently displayed set of map tiles, polygonal area boundaries for comparison properties, or similar data. The data stored in map data 614 may change if the viewport changes, resulting in a different set of depicted map tiles and associated map entries, as well as recalculated colormaps or heatmaps specific to the displayed map entries.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g. steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A non-transitory computer readable storage medium storing instructions that, when executed, cause a processor to perform a method comprising:
   providing a display of a map on a user interface, including:
     determining a first set of geographic tiles depicted on the display, each geographic tile including one or more map entries;
     determining changes at the user interface resulting in a second set of geographic tiles depicted on the display, including:
       determining the changes at the user interface include zooming out the display of the map;
       determining that the zooming out results in a map entry density over a first threshold;
       condensing a plurality of map entries into a first consolidated map entry based on the map entry density being over the first threshold; and
   depicting the first consolidated map entry on the display.

2. The non-transitory computer readable storage medium of claim 1 storing instructions that, when executed, cause the processor to perform the method further comprising:
   determining a selected comparison criteria on which to evaluate the map entries depicted on the display; and
   generating a heatmap based on an evaluation of the map entries according to the selected comparison criteria.

3. The non-transitory computer readable storage medium of claim 2 storing instructions that, when executed, cause the processor to perform the method further comprising:
   dynamically updating the heatmap of the map entries on the display based on the zooming out, including determining a heatmap representation of the first consolidated map entry based on the selected comparison criteria of the plurality of map entries.

4. The non-transitory computer readable storage medium of claim 2 storing instructions that, when executed, cause the processor to perform the method further comprising:
   generating the heatmap on the display includes generating a polygonal boundary around similar map entries based on the selected comparison criteria; and
   dynamically updating the heatmap, including modifying the polygonal boundary based on different map entries depicted on the display due to the changes.

5. The non-transitory computer readable storage medium of claim 2 storing instructions that, when executed, cause the processor to perform the method further comprising:
   loading selected data corresponding to map entries from the first set of geographic tiles depicted on the display only;
   using the selected data for the map entries to generate the heatmap; and
   dynamically updating the heatmap, including loading selected data for map entries from the second set of geographic tiles based on the changes.

6. The non-transitory computer readable storage medium of claim 1 storing instructions that, when executed, cause the processor to perform the method further comprising:
   determining the changes at the user interface further includes zooming in the display of the map;
   determining that the zooming in results in the map entry density falling below a second threshold;
   separating a second consolidated map entry representing a plurality of constituent map entries into separate map entries for the plurality of constituent map entries based on the map entry density being below the second threshold; and
   depicting the separate map entries on the display.

7. The non-transitory computer readable storage medium of claim 6 storing instructions that, when executed, cause the processor to perform the method further comprising:
   determining a selected comparison criteria on which to evaluate the map entries depicted on the display;
   generating a heatmap based on an evaluation of the map entries according to the selected comparison criteria;
   determining a heatmap representation of the second consolidated map entry based on the selected comparison criteria of the plurality of constituent map entries; and
   dynamically updating the heatmap of the map entries on the display based on the zooming in, including depicting separate heat map representations for each of the separate map entries separated from the second consolidated map entry.

8. An apparatus comprising:
a memory including executable instructions;
a processor configured to execute the executable instructions to provide a display of a map on a user interface, including:
   determine a first set of geographic tiles depicted on the display, each geographic tile including one or more map entries;
   determine changes at the user interface resulting in a second set of geographic tiles depicted on the display, including:
      determine the changes at the user interface include zooming in the display of the map;
      determine that the zooming in results in a map entry density falling below a first threshold;
      separate a first consolidated map entry representing a plurality of constituent map entries into separate map entries for the plurality of constituent map entries based on the map entry density being below the first threshold; and
   depict the separate map entries on the display.

9. The apparatus of claim 8, the processor further configured to:
   determine a selected comparison criteria on which to evaluate the map entries depicted on the display;
   load selected data corresponding to map entries from the first set of geographic tiles depicted on the display only;
   generate a heatmap based on an evaluation of the selected data of the map entries according to the selected comparison criteria; and
   dynamically update the heatmap, including loading selected data for map entries from the second set of geographic tiles based on the changes.

10. The apparatus of claim 9, the processor further configured to:
    determine a heatmap representation of the first consolidated map entry based on the selected comparison criteria of the plurality of constituent map entries; and
    dynamically update the heatmap of the map entries on the display based on the zooming in, including depicting separate heat map representations for each of the separate map entries separated from the first consolidated map entry.

11. The apparatus of claim 9, the processor further configured to:
    generate the heatmap on the display, including generating a polygonal boundary around similar map entries based on the selected comparison criteria; and
    dynamically update the heatmap, further including modifying the polygonal boundary based on different map entries depicted on the display due to the changes.

12. The apparatus of claim 8, the processor further configured to:
    determine a selected comparison criteria on which to evaluate the map entries depicted on the display;
    generate a heatmap based on an evaluation of the map entries according to the selected comparison criteria;
    determine the changes at the user interface further include zooming out the display of the map;
    determine that the zooming out results in the map entry density over a second threshold;
    condense a plurality of map entries into a second consolidated map entry based on the map entry density being over the second threshold;
    dynamically update the heatmap of the map entries on the display based on the zooming out, including determine a heatmap representation of the second consolidated map entry based on the selected comparison criteria of the plurality of map entries; and
    depict the heatmap representation of the second consolidated map entry on the display.

13. A method of providing a display of a map on a user interface, including:
    determining a first set of geographic tiles depicted on the display, each geographic tile including one or more map entries;
    determining changes at the user interface resulting in a second set of geographic tiles depicted on the display, including:
       determining the changes at the user interface include zooming out the display of the map;
       determining that the zooming out results in a map entry density over a first threshold;
       condensing a plurality of map entries into a first consolidated map entry based on the map entry density being over the first threshold;
    depicting the first consolidated map entry on the display.

14. The method of claim 13, further comprising:
    determining a selected comparison criteria on which to evaluate the map entries depicted on the display; and
    generating a heatmap based on an evaluation of the map entries according to the selected comparison criteria.

15. The method of claim 14, further comprising:
    dynamically updating the heatmap of the map entries on the display based on the zooming out, including determining a heatmap representation of the first consolidated map entry based on the selected comparison criteria of the plurality of map entries.

16. The method of claim 14, further comprising:
    generating the heatmap on the display includes generating a polygonal boundary around similar map entries based on the selected comparison criteria; and
    dynamically updating the heatmap, including modifying the polygonal boundary based on different map entries depicted on the display due to the changes.

17. The method of claim 14, further comprising:
    loading selected data corresponding to map entries from the first set of geographic tiles depicted on the display only;
    using the selected data for the map entries to generate the heatmap; and
    dynamically updating the heatmap, including loading selected data for map entries from the second set of geographic tiles based on the changes.

18. The method of claim 13, further comprising:
    determining the changes at the user interface further includes zooming in the display of the map;
    determining that the zooming in results in the map entry density falling below a second threshold;
    separating a second consolidated map entry representing a plurality of constituent map entries into separate map entries for the plurality of constituent map entries based on the map entry density being below the second threshold; and
    depicting the separate map entries on the display.

19. The method of claim 18, further comprising:
    determining a selected comparison criteria on which to evaluate the map entries depicted on the display;
    generating a heatmap based on an evaluation of the map entries according to the selected comparison criteria;

determining a heatmap representation of the second consolidated map entry based on the selected comparison criteria of the plurality of constituent map entries; and dynamically updating the heatmap of the map entries on the display based on the zooming in, including depicting separate heat map representations for each of the separate map entries separated from the second consolidated map entry.

\* \* \* \* \*